Patented July 29, 1941

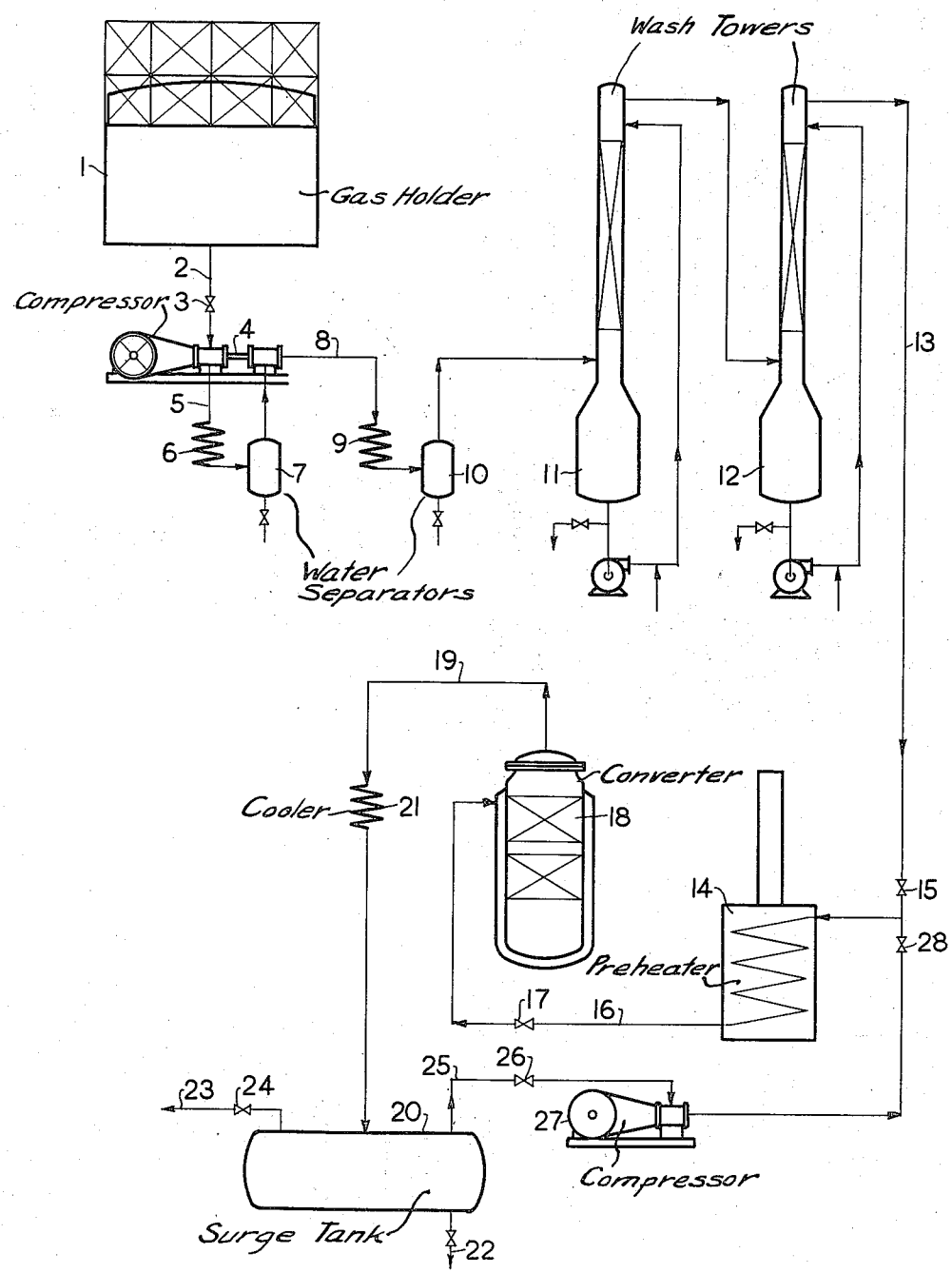

2,251,000

UNITED STATES PATENT OFFICE 2,251,000

PROCESS FOR PURIFYING GASES

Frederic Marinus Pyzel, Piedmont, Calif., assignor to Shell Development Company, San Francisco, Calif., a corporation of Delaware Application October 2, 1939, Serial No. 297,568

3 Claims. (Cl. 23—3)

The present invention relates to the removal of impurities from gases, and more particularly to the removal of carbon monoxide from hydrogen to be used in chemical synthesis under pressure.

It is a well known fact that oxygen, water, carbon monoxide, carbon dioxide and other impurities exert a harmful effect upon catalytic masses used for ammonia synthesis and in the hydrogenation of hydrocarbons, and that these impurities, even in small quantities, eventually cause an impairment in the effectiveness of the catalyst when present in the make-up gas.

A number of processes have already been proposed with a view to removing these harmful impurities in the gases, whereby the effectiveness of the catalyst employed in chemical synthesis is prolonged, as, for example, carbon monoxide may be removed by catalytic hydrogenation to methane, according to the reaction:

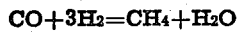

$$CO+3H_2=CH_4+H_2O$$

Heretofore it has not been considered economically feasible to remove relatively large quantities of carbon monoxide from gases by conversion to methane due to the rapid poisoning of the catalyst used for such conversion.

An object of this invention is to provide an improved method for removing carbon monoxide by conversion to methane.

The temperature at which the reaction of carbon monoxide to methane initiates will vary with the type of converter and the concentration of carbon monoxide in the gas to be treated. In adiabatic converters a temperature of about 240° C. is necessary when the incoming gas contains approximately 0.7 volume per cent of carbon monoxide. With 1.0 volume per cent an initiating temperature of 230° C. is required, while at 1.5 volume per cent concentration an initiating temperature of 210° C. suffices.

In an adiabatic converter the temperature of the gas increases about 70° C. for every one volume per cent of carbon monoxide converted. Therefore if, for example, an adiabatic converter is operating at an exit temperature of about 290° C., in removing 0.7 volume per cent carbon monoxide from a hydrogen gas stream, and the carbon monoxide content of the incoming gas is increased to, say, 2.7 volume per cent, the temperature at the converter exit will rise to about 430° C. At this temperature the catalyst will be greatly impaired.

The water content of the reacting gases is also a factor that must be considered. It is known that the presence of water vapor in the converter will cause a temporary deactivation of the catalyst. It has been found that a water vapor content of as much as 5 volume per cent will have an extremely deleterious effect upon the catalyst, 1 volume per cent or less, preferably 0.7 volume per cent, being the approximate upper limit at which the catalytic reaction may be efficiently carried out.

The present invention contemplates a system whereby the concentration of carbon monoxide and water vapor in the gas entering the converter is maintained at an optimum figure, to insure both complete purification and long catalyst life.

Referring to the accompanying schematic flow diagram, a gas-holder 1 containing carbon monoxide contaminated gases including hydrogen, is provided with a conduit 2 leading through valve 3 to the first stage of a two-stage compressor 4. From the discharge side of the first stage of the compressor 4 a conduit 5 leads through a cooler 6 and water separator 7 to the second stage of the compressor 4. Conduit 8 leads from the second stage of the compressor 4 to an after-cooler 9, water separator 10 and wash towers 11 and 12. Conduit 13 leads from wash tower 12 to a preheater 14 through valve 15. Conduit 16 leads through valve 17 to a converter 18. Conduit 19 leads from the converter 18 to a surge tank 20, passing through a cooler 21. Surge tank 20 is provided with a water dropout at 22, a conduit 23 leading through valve 24 and a conduit 25 leading through a valve 26 to a circulatory compressor 27 and thence to valve 28 and conduit 13.

In operation the system operates as a continuous circulatory process. Contaminated gas is passed under pressure from the gas-holder 1 through conduit 2, valve 3, the first stage of compressor 4, conduit 5, cooler 6, water separator 7, the second stage of compressor 4, conduit 8, after cooler 9, water separator 10 and wash towers 11 and 12. In this manner, water vapor in the raw gas is removed during the compression and cooling steps and other impurities exclusive of carbon monoxide, for example hydrogen sulfide and carbon dioxide, removed in the wash towers.

Gas containing only carbon monoxide as an impurity is then passed through conduit 13 and valve 15 to preheater 14 and thence through conduit 16 and valve 17 to converter 18. The exiting gas from the converter passes through conduit 19 and cooler 21 to surge tank 20. Water vapor resulting from the reaction and condensed in cooler 21 is dropped out at 22, purified gas is passed through conduit 23 and valve 24 to utilization and part of the purified gas, the quantity depending upon the CO concentration of the contaminated gas entering the converter, is recirculated through conduit 25, valve 26, compressor 27, and valve 28 to conduit 13 where it is mixed with the incoming unpurified gas.

As a specific example, assuming that it is desired to remove carbon monoxide by conversion to methane in the presence of nickel catalyst from hydrogen produced by thermal decomposition of hydrocarbons and containing 3 volume per cent of carbon monoxide, it having been previously determined experimentally that ±0.7 volume per cent carbon monoxide is the optimum amount that may be removed with relatively little damage to a nickel catalyst, then the contaminated gas will be passed to the converter after being compressed to a pressure of six atmospheres, and having its water content reduced to 0.7% (namely, saturation at atmospheric temperature and a pressure of six atmospheres) by means of the coolers 6 and 9 and water separators 7 and 10. In this manner, the water content present, which is known to impair the efficiency of the catalyst, is reduced to a safe value. The entering gases are brought up to the initial reaction temperature of approximately 240° C. in the preheater 14.

At the same time, carbon monoxide-free hydrogen is supplied to the converter from the surge tank through the circulating compressor and preheater. By controlling valves 26, 28, and 15, the ratio of purified hydrogen to contaminated hydrogen fed to the converter in this case will be maintained at about 4:1, in order to reduce the carbon monoxide content of the gas entering the converter from 3 volume per cent to 0.7 volume per cent.

It will thus be seen that we have a system in which the water content of the raw gas is reduced to a safe figure through compression and cooling (the gas, however, being saturated with water vapor at the increased pressure). The high CO content is reduced by dilution with gas previously treated (but saturated with water vapor at the pressure of the system). The mixed gas stream is passed over the catalyst whereby water vapor is formed. The gas stream already being saturated with water vapor, this excess water vapor is readily removed by cooling the gas stream to atmospheric temperatures. Alternatively, the system could be operated at atmospheric pressure with refrigerating applied instead of atmospheric cooling at 9 and 21.

Operating according to the present invention a catalyst life of three months may be expected, whereas an attempt to remove 3 volume per cent carbon monoxide directly would result in complete catalyst failure within a matter of hours.

Although the example cited illustrates carbon monoxide removal from hydrogen in an adiabatic converter in the presence of a nickel catalyst, it is to be understood that this is by way of illustration only. Other converter types, as for example those of the externally heated type and other catalysts, as for example cobalt and palladium, are equally susceptible to the present improved system of operation.

I claim as my invention:

1. In a continuous process for removing carbon monoxide from hydrogen containing gases contaminated with more than 0.7 per cent by volume of carbon monoxide by catalytic conversion to methane, the steps comprising passing an entering stream of carbon monoxide contaminated hydrogen containing gases to a reaction zone containing a nickel catalyst, reacting said carbon monoxide to produce methane and water, continuously withdrawing gases from said reaction zone, separating the water content from said withdrawn gases, and continuously recycling a portion of the water free and carbon monoxide free withdrawn gases to said entering stream in quantities sufficient to maintain the carbon monoxide concentration in said entering stream at a value not exceeding approximately 0.7 volume per cent.

2. In a continuous process of removing carbon monoxide from hydrogen containing gases, having more than 0.7 per cent by volume of carbon monoxide, by catalytic conversion to methane, wherein said gases are passed through a reaction zone containing a catalyst mass containing a metal selected from the group consisting of nickel, cobalt and palladium, the steps of separating water vapor from the gases leaving the reaction zone, and recycling a sufficient quantity of the substantially water free exit gases to said reaction zone to maintain the carbon monoxide content of the gas in the reaction zone at less than 0.7 per cent by volume.

3. In a continuous process for removing carbon monoxide from hydrogen containing gases having more than 0.7 per cent by volume of carbon monoxide, the steps comprising passing a stream of hydrogen containing gas through a reaction zone containing a nickel catalyst, continuously withdrawing a carbon monoxide free gas from the exit of said reaction zone, and adjusting the recycle of sufficient of said carbon monoxide free gas to the entrance of said reaction zone so that the gas passing to the nickel catalyst in said reaction zone contains less than 0.7 per cent by volume of carbon monoxide.

FREDERIC MARINUS PYZEL.